US008884909B2

(12) United States Patent
Huang et al.

(10) Patent No.: US 8,884,909 B2
(45) Date of Patent: Nov. 11, 2014

(54) CONTROL CIRCUIT AND CONTROL METHOD FOR CAPACITIVE TOUCH PANEL

(75) Inventors: Chun-Chung Huang, Hsinchu (TW); Tsun-Min Wang, Changhua (TW); Chun-Yu Lin, Taichung County (TW)

(73) Assignee: Elan Microelectronics Corporation, Hsinchu (TW)

( * ) Notice: Subject to any disclaimer, the term of this patent is extended or adjusted under 35 U.S.C. 154(b) by 1024 days.

(21) Appl. No.: 12/379,573

(22) Filed: Feb. 25, 2009

(65) Prior Publication Data

US 2010/0110037 A1 May 6, 2010

(30) Foreign Application Priority Data

Oct. 31, 2008 (TW) .............................. 097142063 A

(51) Int. Cl.
  *G06F 3/045* (2006.01)
  *G06F 3/043* (2006.01)
  *G06F 3/044* (2006.01)
(52) U.S. Cl.
  CPC ...................................... *G06F 3/044* (2013.01)
  USPC .......................................... 345/174; 345/173
(58) Field of Classification Search
  CPC .......... G06F 3/044; G06F 2203/04107; G06F 2203/04111
  USPC ...................... 345/156–184; 178/18.01–20.04
  See application file for complete search history.

(56) References Cited

U.S. PATENT DOCUMENTS

| 4,319,237 | A | * | 3/1982 | Matsuo et al. ................ 345/101 |
| 4,829,305 | A | * | 5/1989 | LaBudde ...................... 342/127 |
| 5,920,309 | A | * | 7/1999 | Bisset et al. .................. 345/173 |
| 5,945,980 | A | * | 8/1999 | Moissev et al. .............. 345/173 |
| 5,952,998 | A | * | 9/1999 | Clancy et al. ................ 345/173 |
| 2004/0003949 | A1 | * | 1/2004 | Lin ........................... 178/18.01 |
| 2004/0215853 | A1 | * | 10/2004 | Marx et al. ...................... 710/69 |
| 2005/0073507 | A1 | * | 4/2005 | Richter et al. ................ 345/174 |
| 2007/0182719 | A1 | * | 8/2007 | Lee et al. ...................... 345/173 |
| 2008/0062139 | A1 | * | 3/2008 | Hotelling et al. ............. 345/173 |
| 2008/0158167 | A1 | * | 7/2008 | Hotelling et al. ............. 345/173 |

* cited by examiner

*Primary Examiner* — Patrick F Marinelli
(74) *Attorney, Agent, or Firm* — Muncy, Geissler, Olds & Lowe, P.C.

(57) ABSTRACT

A control circuit and a control method for a capacitive touch panel are provided. Therein, while a scanning signal charges and discharges each trace on the capacitive touch panel, a signal in phase with the scanning signal is provided to traces adjacent to the scanned trace or a ground layer under the scanned trace so as to lower parasitic capacitances between the scanned trace and the ground layer or other traces, thereby decreasing a base capacitance of the capacitive touch panel and enhancing a sensing result of the control circuit as well as providing a shielding effect and reducing noise interference so that the capacitive touch panel has improved performance.

13 Claims, 15 Drawing Sheets

CONTROL CIRCUIT AND CONTROL METHOD FOR CAPACITIVE TOUCH PANEL

BACKGROUND OF THE INVENTION

1. Technical Field

The present invention is related to a capacitive touch panel, more particularity, to a control circuit and control method for a capacitive touch panel.

2. Description of Related Art

Capacitive touch panels are lightweight, compact, power saving, and durable so as to be widely used as panels of notebook computers, cell phones, personal digital assistants, and multimedia players. Typically, a capacitive touch panel comprises a printed circuit board, a piece of glass, or a plastic film as a substrate. A conductive film of metal or indium tin oxide or a pattern made of other materials is printed on the substrate as sensors, whose shapes and sizes vary with intended applications. When the touch panel is touched by a stylus or a user's finger, change in capacitance takes place at the sensors. A control circuit detects the changes of capacitance at the sensors to obtain information input by the user and thus enable touch control. Therefore, a conventional technique for enhancing performance of a touch panel is to increase the change of capacitance ($\Delta C$) resulting from contact by a conductor. For instance, U.S. Pat. No. 5,920,309 proposes a control method for a capacitive touch panel wherein antiphase current signals are used to charge and discharge adjacent sensors so that change of capacitance is augmented differentially, thereby improving performance of the touch panel.

However, in addition to the change of capacitance ($\Delta C$), the performance of a capacitive touch panel is related to its base capacitance (CBASE). When the base capacitance is high, the change of capacitance is less apparent and therefore difficult to detect, which leads to low performance. In other words, the performance of a capacitive touch panel is in direct proportion to $\Delta C/CBASE$. The conventional differential detection method, though capable of increasing change of capacitance, also increases parasitic capacitances between adjacent sensors. As a result, the capacitive touch panel has a high base capacitance, and there is limited room for improvement of performance.

BRIEF SUMMARY OF THE INVENTION

According to the present invention, a control circuit for a capacitive touch panel comprises a modulator for providing a first signal and a second signal in phase with the first signal, a multiplexer coupled with the capacitive touch panel and the modulator for providing the first signal to a first trace on the capacitive touch panel and the second signal to a second trace on the capacitive touch panel, and a demodulator coupled with the multiplexer for demodulating a signal on the first trace with a reference signal.

According to the present invention, a control circuit for a capacitive touch panel comprises a modulator for providing a first signal and a second signal in phase with the first signal, and a multiplexer coupled with the capacitive touch panel and the modulator for providing the first signal to a sensor layer of the capacitive touch panel and the second signal to a ground layer of the capacitive touch panel.

The present invention proposes a control method for a capacitive touch panel, wherein the capacitive touch panel comprises a first trace and a second trace. The control method comprises the steps of: providing a first signal so as to charge and discharge the first trace, providing a second signal in phase with the first signal so as to charge and discharge the second trace, and demodulating a signal on the first trace with a reference signal.

The present invention proposes a control method for a capacitive touch panel, wherein the capacitive touch panel comprises a sensor layer and a ground layer. The control method comprises the steps of: providing a first signal so as to charge and discharge the sensor layer, and providing a second signal in phase with the first signal to the ground layer.

In the control circuit and control method for a capacitive touch panel according to the present invention and applications thereof, in-phase signals are provided for lowering parasitic capacitances between adjacent conductors and decreasing a base capacitance of the touch panel so as to enhance a sensing result. Therefore, a wider detection range and a greater thickness of capacitive medium than in the prior art are made possible to further improve the performance of the capacitive touch panel.

BRIEF DESCRIPTION OF THE SEVERAL VIEWS OF THE DRAWINGS

The invention as well as a preferred mode of use, further objectives, and advantages thereof will be best understood by referring to the following detailed description of illustrative embodiments in conjunction with the accompanying drawings, wherein.

DETAILED DESCRIPTION OF THE INVENTION

Figure 1:
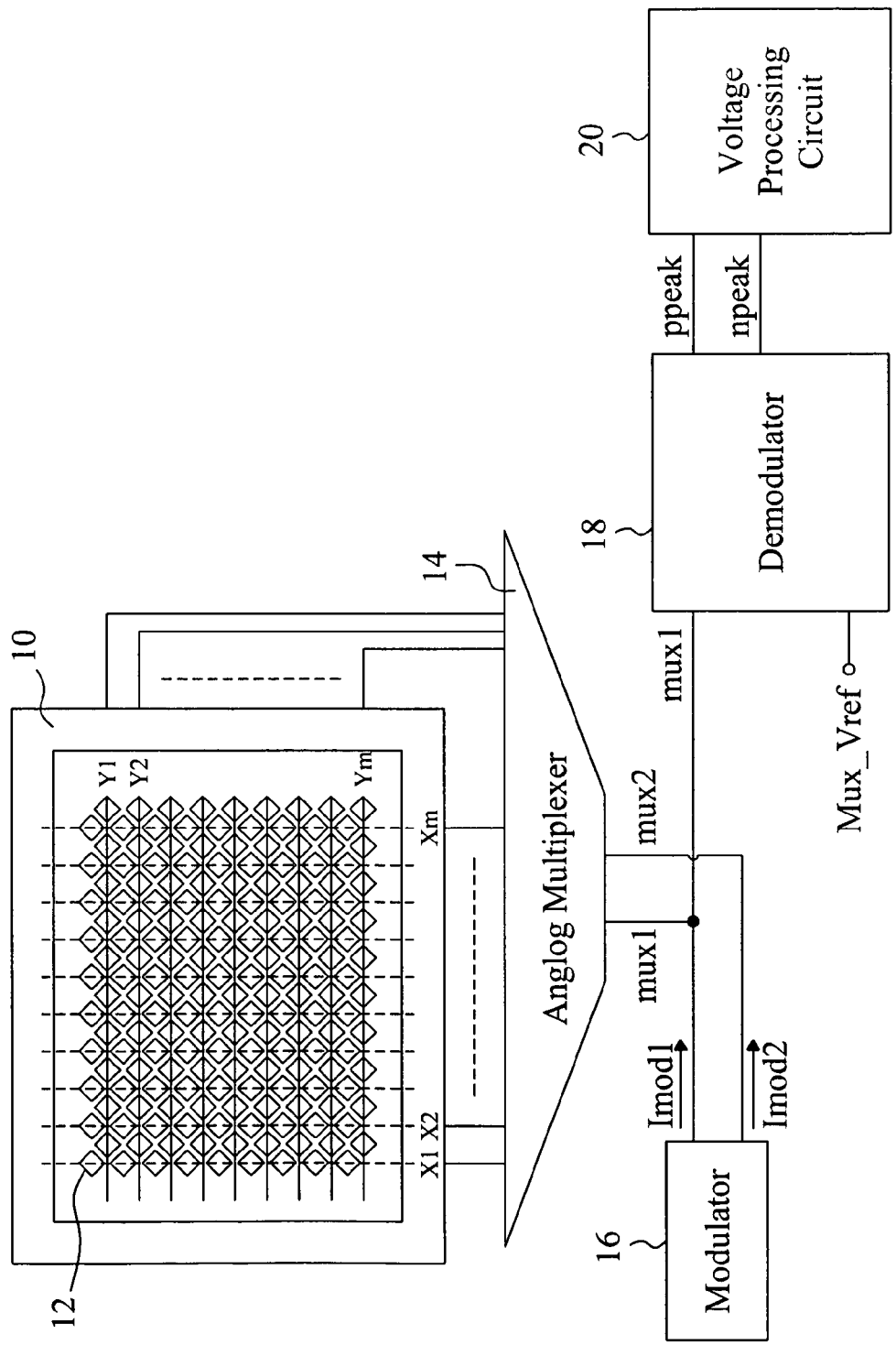
FIG. 1 is a schematic drawing of a first embodiment of the present invention.

Referring to FIG. 1 for a schematic drawing of an embodiment of the present invention, a capacitive touch panel 10 is provided with a plurality of sensors 12. The vertically aligned sensors 12 are connected by a conductive wire so as to form traces X1, X2 . . . Xm while the horizontally aligned sensors 12 form traces Y1, Y2 . . . Ym. A modulator 16 produces current signals that are supplied to traces selected by an analog multiplexer 14 and are thus modulated into signals mux1 and mux2. A demodulator 18 demodulates the signal mux1 with a reference signal Mux_Vref so as to produce signals ppeak and npeak that are supplied to a voltage processing circuit 20. The voltage processing circuit 20 transforms a voltage difference between the signals ppeak and npeak so as to obtain information corresponding to changes of capacitance on the capacitive touch panel 10.

Figure 2:
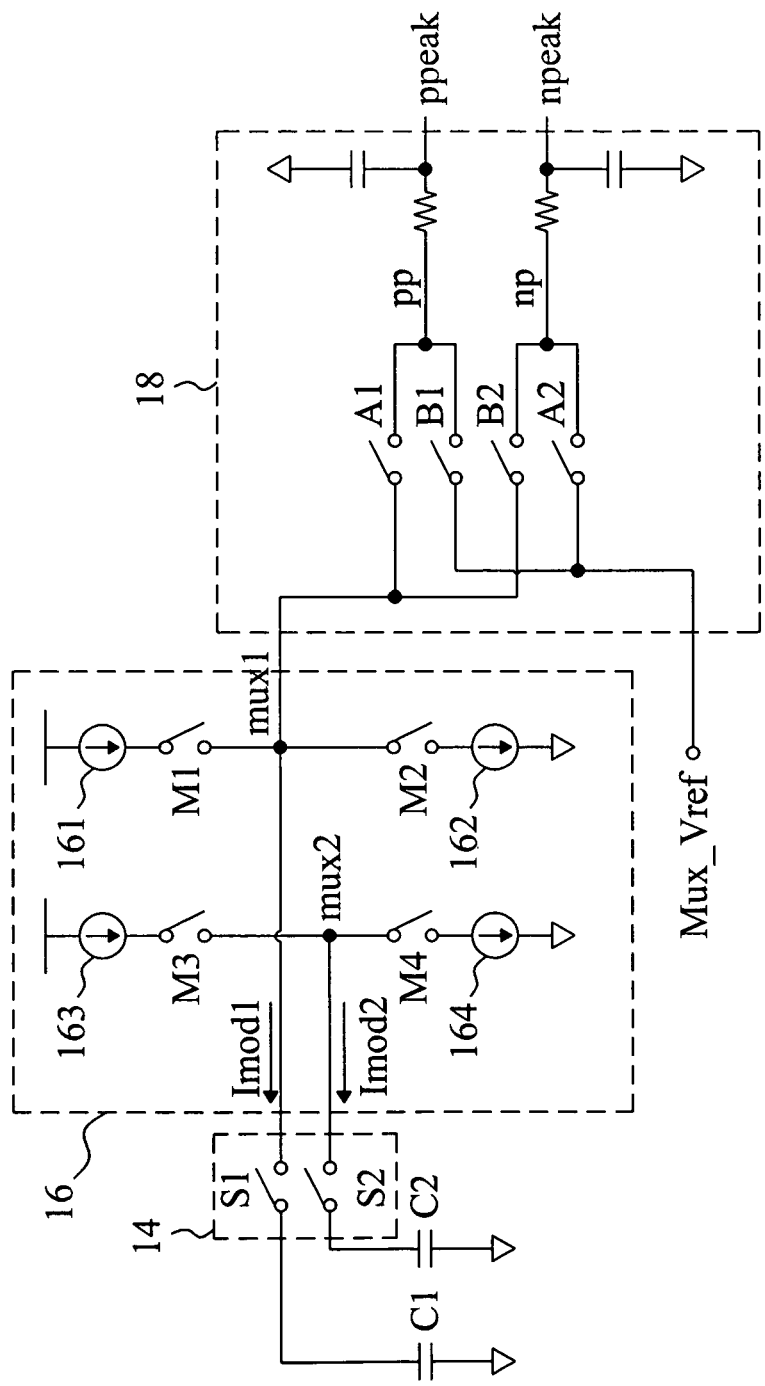
FIG. 2 is a circuit diagram for the embodiment shown in FIG. 1.
Figure 3:
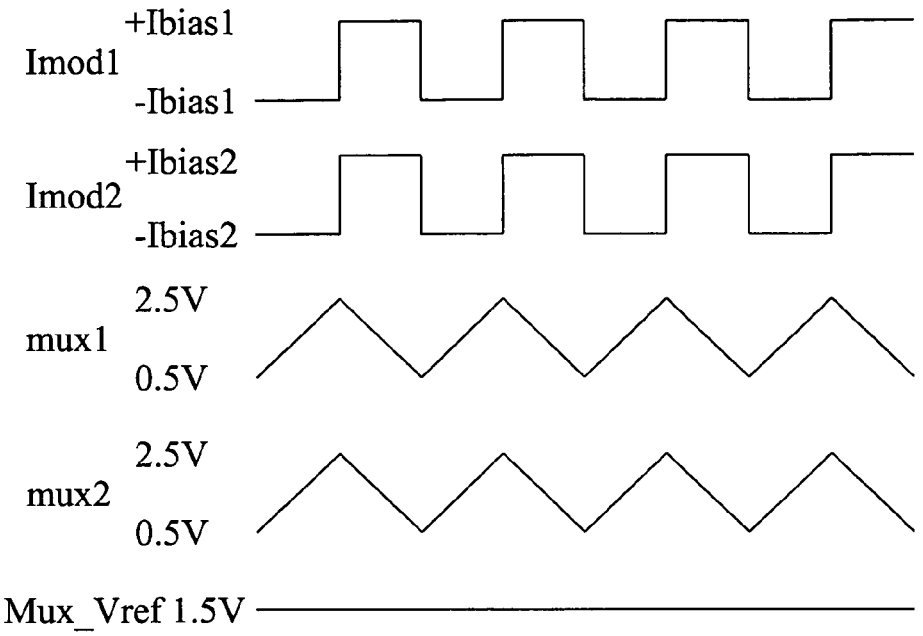
FIG. 3 is an oscillogram of signals in the first embodiment of the present invention.
Figure 3:
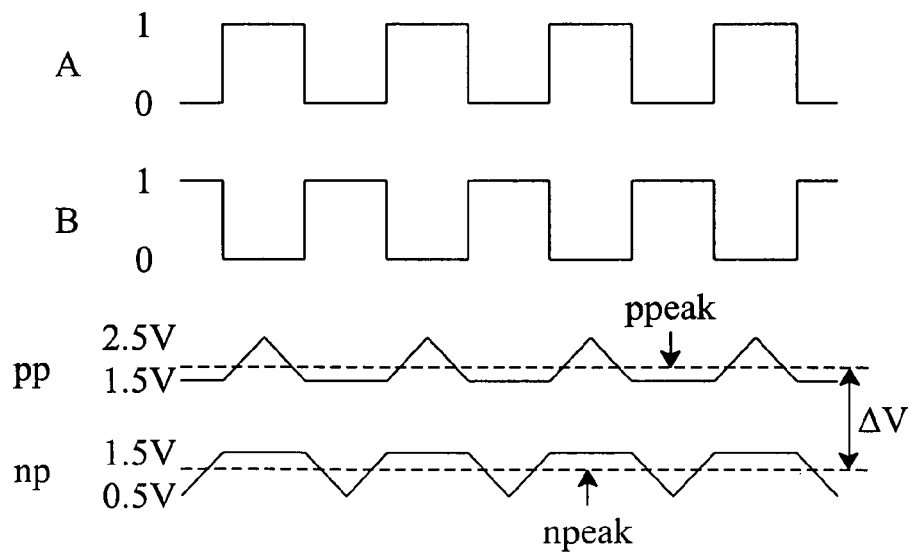

FIG. 2 is a circuit diagram for the embodiment of FIG. 1 while FIG. 3 is an oscillogram of signals at single ends of the modulator and the demodulator. When the capacitive touch panel 10 is in operation, current sources 161~164 provide modulated currents which pass through modulating switches M1~M4 controlled by a modulating clock of a frequency generator (not shown in the drawings) so as to produce in-phase current signals Imod1 and Imod2. In FIG. 2, switches S1 and S2 represent the multiplexer 14 of FIG. 1. The current signal Imod1 charges and discharges a first trace on the capacitive touch panel 10 via the switch S1 such that the first trace has an equivalent capacitance represented by a capacitor C1, and a voltage signal mux1 is produced. On the other hand, the current signal Imod2 charges and discharges a second trace via the switch S2 such that the second trace has an equivalent capacitance represented by a capacitor C2, and a voltage signal mux2 is produced. Demodulating clocks A and B control demodulating switches A1, B1, A2, and B2 to demodulate the voltage signal mux1 with the DC reference signal Mux_Vref so as to produce half-wave rectified signals pp and np. The signals pp and np are then filtered by RC filter circuits and become DC signals ppeak and npeak. A voltage difference $\Delta V$ between the signals ppeak and npeak is related to a change of capacitance on the first trace. In this embodiment, the signal mux1 has a positive peak at 2.5V and a negative peak at 0.5V. In other words, the first trace has a base voltage difference $\Delta V$ of 1V. $\Delta V$ drops when a conductor causes an induced capacitance on the first trace. As shown in FIG. 1, the analog multiplexer 14 performs the aforesaid charge and discharge scan on the traces of the capacitive touch panel 10 successively with the current signals provided by the modulator 16. Afterward, the voltage processing circuit 20 transforms the voltage difference $\Delta V$ on each trace into waveforms corresponding to changes of capacitance on the capacitive touch panel 10.

Figure 4:
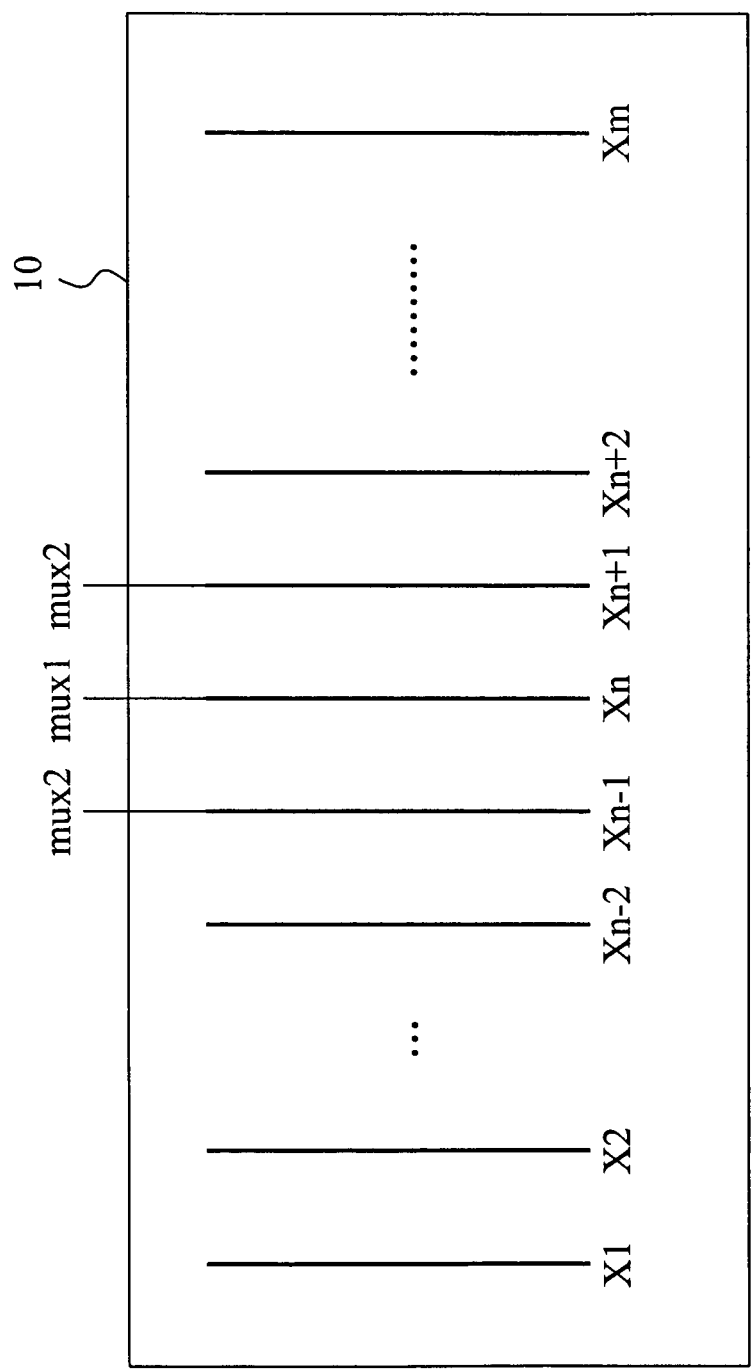
FIG. 4 is a schematic drawing showing a charge and discharge scan of traces performed according to a control method of the present invention.
Figure 5:
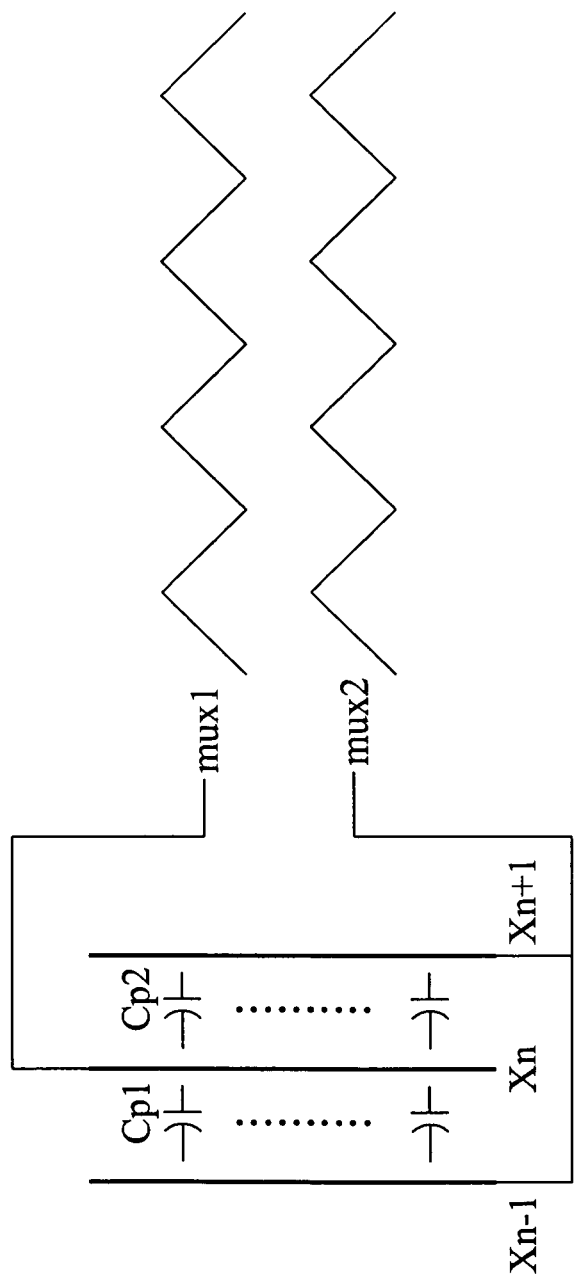
FIG. 5 illustrates parasitic capacitances between the traces of FIG. 4.

If the conventional differential detection method for touch panels were used, antiphase current signals would be provided to charge and discharge adjacent traces. Consequently, the voltage signals on the first trace and on the second trace would be in antiphase to increase change of capacitance between the adjacent traces. Moreover, the antiphase signal on the second trace would be supplied to the demodulator for demodulating a signal on the first trace. In the present invention, however, the signal mux1 is not demodulated with the signal mux2 but with the reference signal additionally supplied to the demodulator 18 so that it is not necessary for the signal mux2 to be in antiphase with the signal mux1. FIG. 4 is a schematic drawing showing a charge and discharge scan performed according to the present invention. When the first trace to be scanned is Xn, the multiplexer connects the current signal Imod1 to the trace Xn so as to produce the voltage signal mux1. The multiplexer also provides the current signal Imod2 to traces Xn+1 and Xn−1 on two sides of and adjacent to the trace Xn so as to produce the voltage signal mux2. As shown in FIG. 5, the signal mux2 and the signal mux1 are in phase, and, consequently, parasitic capacitances Cp1 and Cp2 between the trace Xn and the traces Xn+1 and Xn−1 are small, which makes variation of the voltage difference $\Delta V$ more apparent. Besides, the signal mux2 also provides a shielding effect to the signal mux1 on the trace Xn, thereby reducing interference to the signal mux1 and improving efficiency of touch control.

Figure 6:
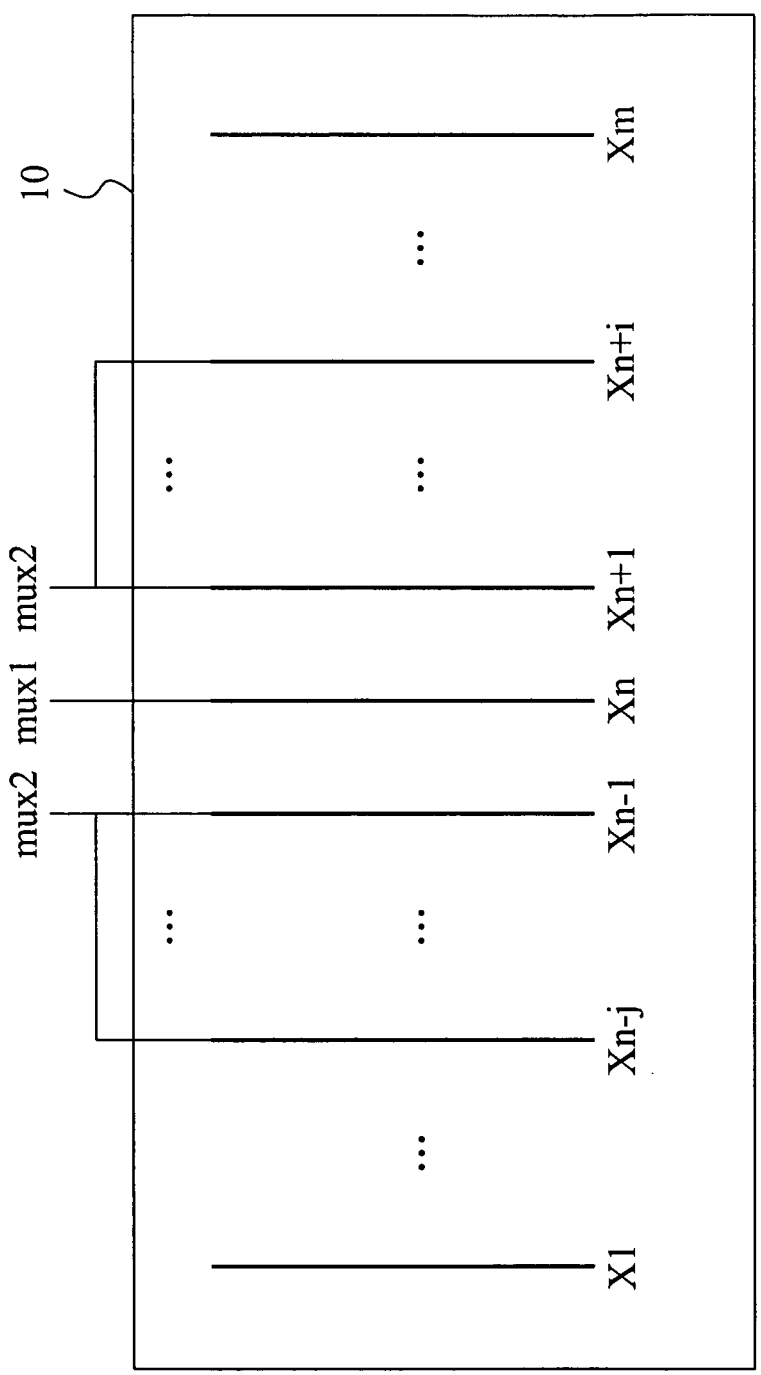
FIG. 6 is a schematic drawing of a variation of the control method according to the present invention.

Please refer to FIG. 6 for a schematic drawing showing a variation of the control method according to the present invention. When the first trace to be scanned is Xn, the multiplexer charges and discharges the trace Xn to produce the signal mux1. Meanwhile, the multiplexer charges and discharges a plurality of traces Xn−j~Xn−1 and Xn+1~Xn+i on two sides of and adjacent to the trace Xn so as to produce the signal mux2. Thus, parasitic capacitances between the adjacent traces are also improved, and an even better shielding effect is provided.

Figure 7:
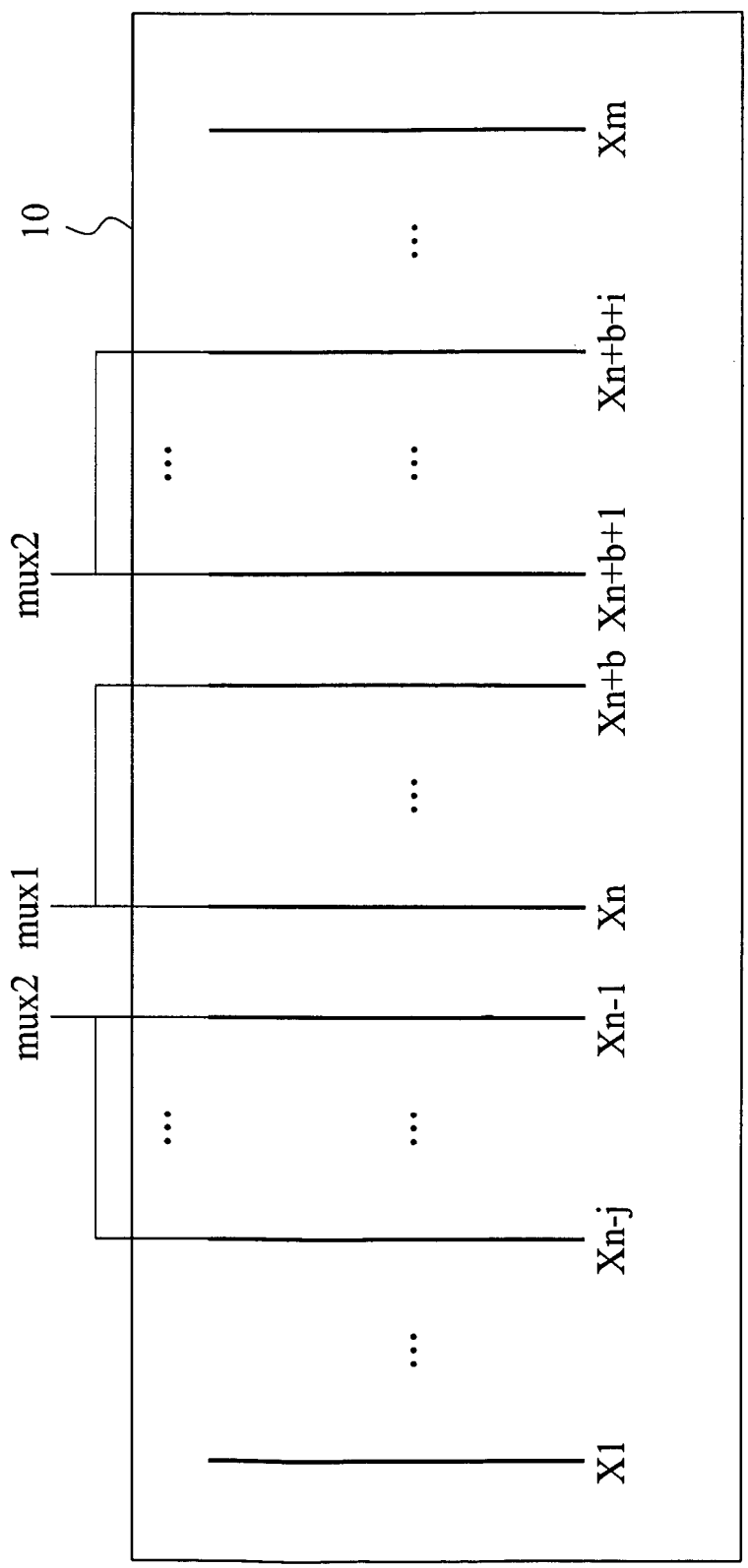
FIG. 7 is a schematic drawing of another variation of the control method according to the present invention.

Referring to FIG. 7 for another variation of the control method according to the present invention, a plurality of traces Xn~Xn+b are scanned simultaneously, and while the traces Xn~Xn+b are being charged and discharged, a signal in phase with the current signal charging and discharging the traces Xn~Xn+b are provided to traces Xn−j~Xn−1 and traces Xn+b+1~Xn+b+i so as to produce the in-phase voltage signals mux1 and mux2, thereby facilitating detection of change in capacitance on the traces Xn~Xn+b.

Figure 8:
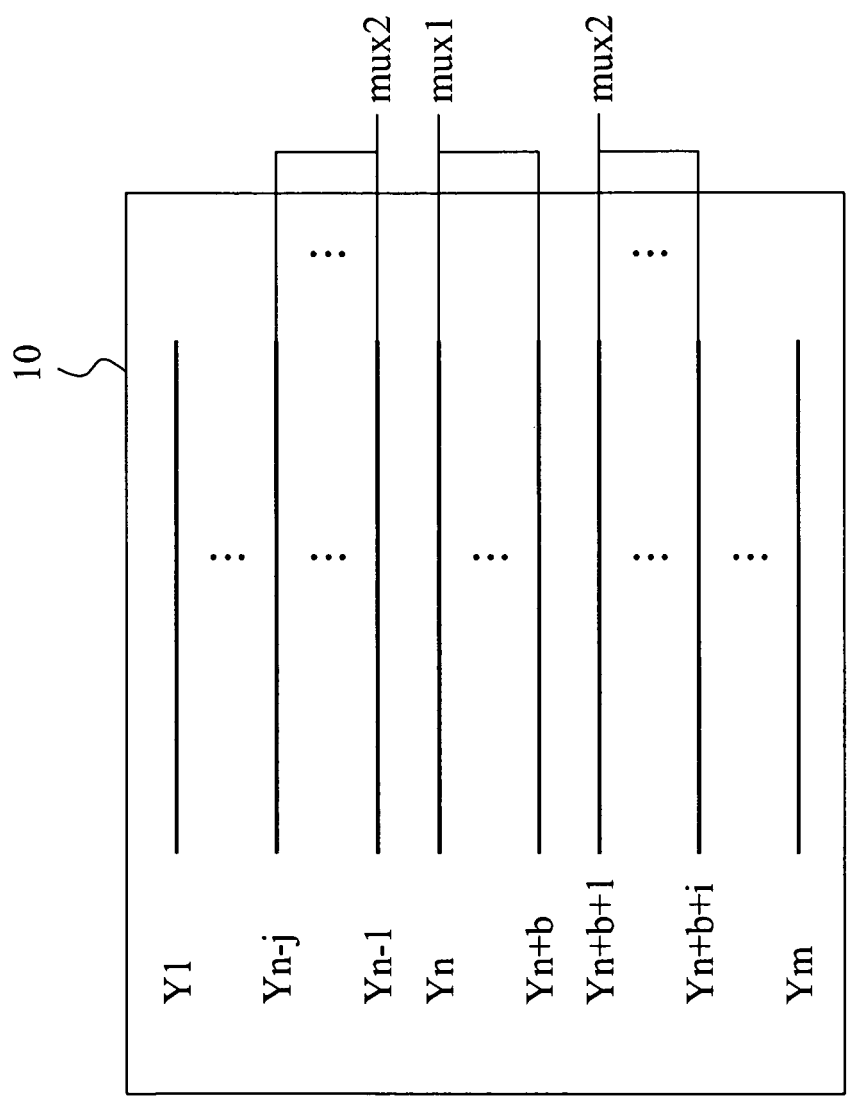
FIG. 8 is a schematic drawing showing application of the embodiment of FIG. 7 to Y-direction traces.

FIG. 8 is a schematic drawing showing application of the embodiment of FIG. 7 to Y-direction traces. Therein, the signal mux1 is provided to traces Yn~Yn+b while the signal mux2 is provided to traces Yn−j~Yn−1 and traces Yn+b+1~Yn+b+i on two sides of and adjacent to the traces Yn~Yn+b.

Figure 10:
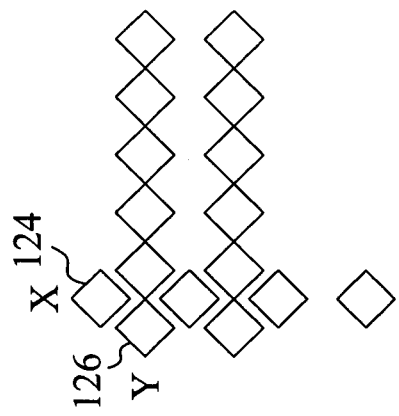
FIG. 10 is a top view of another common type of capacitive sensors.
Figure 9:
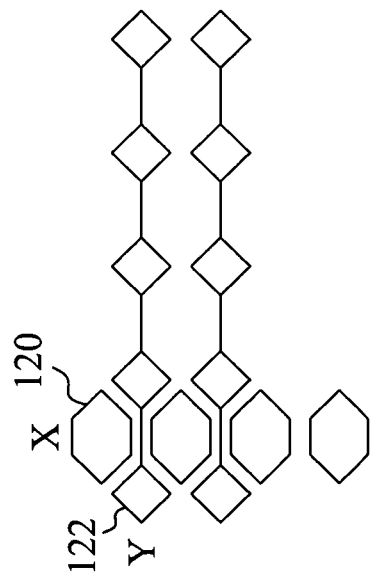
FIG. 9 is a top view of a common type of capacitive sensors.

The control circuit and control method proposed by the present invention are not limited by the shape and size of sensors. Please refer to FIGS. 9 and 10 for capacitive sensors that are commonly seen. In FIG. 9, X-direction sensors 120 are polygonal while Y-direction sensors 122 are diamond-shaped. In FIG. 10, both X-direction sensors 124 and Y-direction sensors 126 are diamond-shaped, wherein the X-direction sensors 124 are connected by a conductive wire (not shown in the drawing), and the Y-direction sensors 126 are directly connected to one another. In other embodiments, the unit capacitive sensors may have circular or other shapes, and may be left out as needed according to the desired formation.

Figure 11:
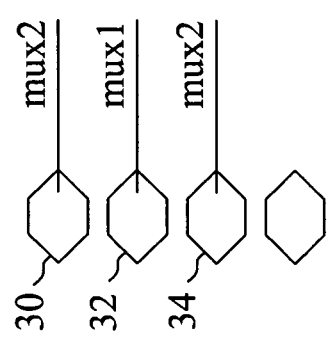
FIG. 11 is a schematic drawing showing application of the present invention to one-dimensional sensors.

FIG. 11 is a schematic drawing showing application of the present invention to one-dimensional sensors. While a sensor 32 is being charged and discharged, a signal in phase with the signal charging and discharging the sensor 32 is provided to charge and discharge sensors 30 and 34 on two sides of and adjacent to the sensor 32, thereby producing the in-phase signals mux1 and mux2, lowering parasitic capacitances between the sensor 32 and the sensors 30, 34, and reducing noise interference.

Figure 12:
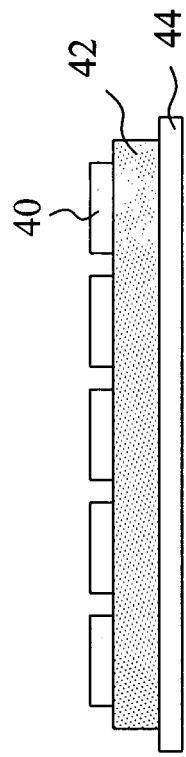
FIG. 12 is a sectional view of a two-layer sensor.

The control method of the present invention is equally applicable to reducing parasitic capacitances in the Z direction. FIG. 12 is a sectional view of a two-layer sensor, wherein a sensor layer 40 is a conductive film of metal or indium tin oxide printed on a dielectric layer 42, and a ground layer 44 is disposed under the dielectric layer 42. In this embodiment, a shielding signal in phase with a scanning signal on the sensor layer 40 is supplied to the ground layer 44 so that in-phase signals are produced on the sensor layer 40 and the ground layer 44. In consequence, a parasitic capacitance between the sensor layer 40 and the ground layer 44 is lowered while a shielding effected is provided.

Figure 13:
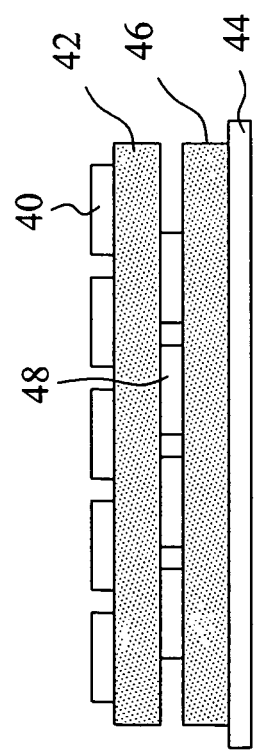
FIG. 13 is a sectional view of a three-layer sensor.

FIG. 13 is a sectional view of a three-layer sensor, wherein sensor layers 40 and 48 are composed of conductive films of metal or indium tin oxide while dielectric layers 42 and 46 separate the sensor layers 40, 48 and a ground layer 44 from one another. In this embodiment, scanning signals on the sensor layers 40 and 48 are in phase. Meantime, a shielding signal supplied to the ground layer 44 is in phase with the scanning signals so as to lower parasitic capacitances between the sensor layers 40, 48 and the ground layer 44 and provide a shielding effect.

Figure 14:
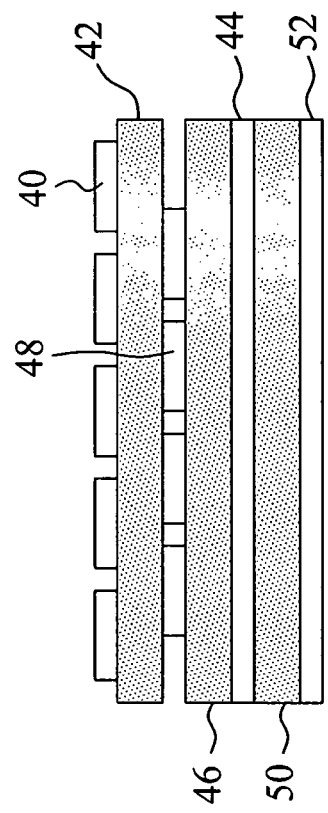
FIG. 14 is a sectional view of a four-layer sensor.

FIG. 14 is a sectional view of a four-layer sensor, wherein a dielectric layer 50 and a component layer 52 are disposed under a ground layer 44. Similar to the previous embodiments, shielding signals supplied to the ground layer 44 and sensor layers 40, 48 are in phase.

Figure 15:
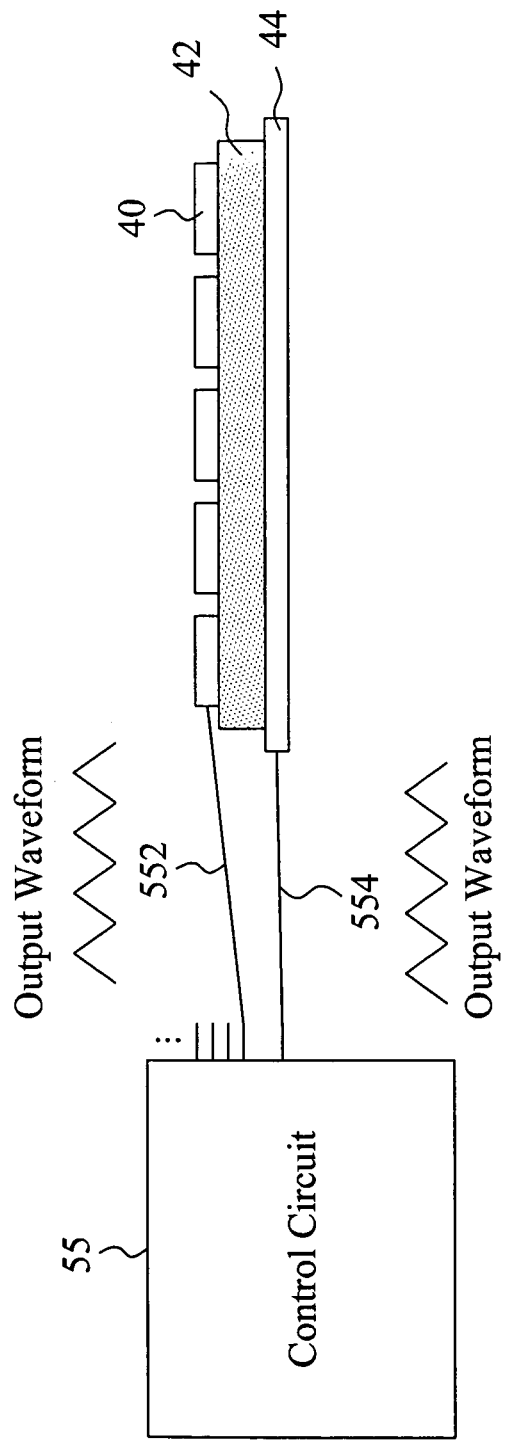
FIG. 15 is a schematic drawing of an embodiment of a capacitive touch panel module according to the present invention.

FIG. 15 is a schematic drawing of an embodiment of a capacitive touch panel module according to the present invention. As shown in the drawing, a control circuit 55 provides via a conductive wire 552 a scanning signal for charging and discharging each sensor on a sensor layer 40. In addition, the control circuit 55 provides via a conductive wire 554 a shielding signal in phase with the scanning signal to a ground layer 44. In other embodiments, the sensor may have a three-layer or four-layer structure.

When a conventional capacitive touch panel is applied to a touch screen, it is necessary to add a ground layer under the sensors so as to reduce noise radiated from the screen. However, the ground layer inherently decreases a capacitive sensing result of a circuit. While the present invention also uses the ground layer or other conductive layers that must be additionally provided under the sensor layer of the prior art device, the shielding signal supplied to the ground layer of the present invention is in phase with the sensor scanning signal to significantly reduce a base capacitance as detected by a detection circuit. The significantly reduced base capacitance in turn enhances a sensing result of the capacitive touch panel and thereby overcomes the drawbacks of the conventional capacitive touch screen.

Figure 16:
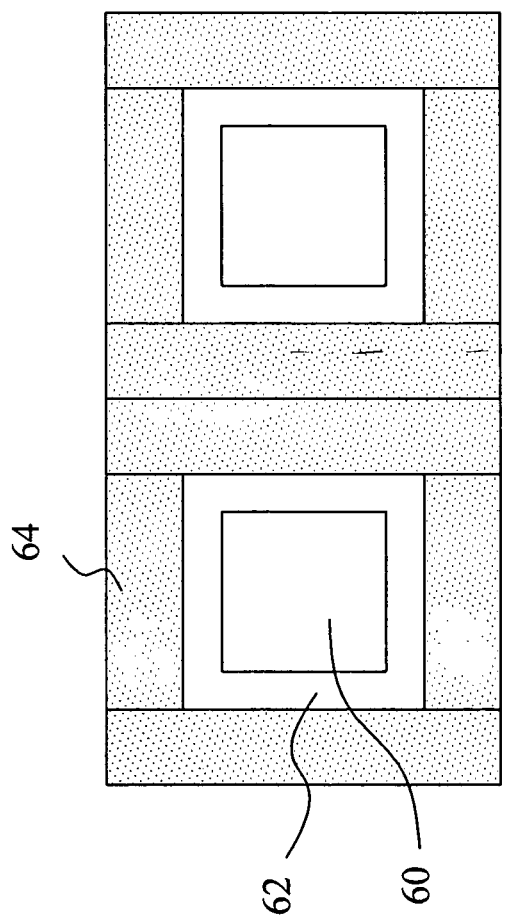
FIG. 16 is a top view of press button-type sensors.
Figure 17:
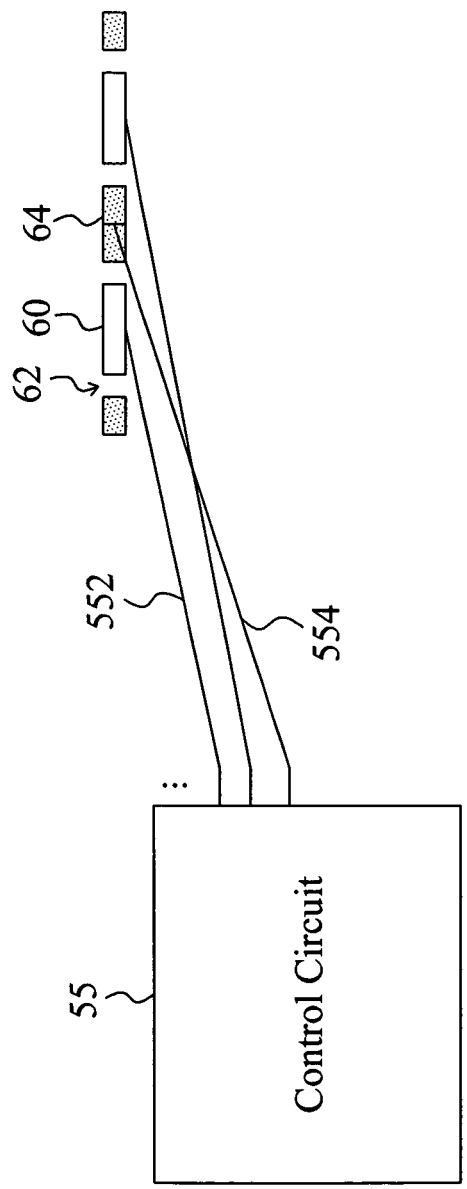
FIG. 17 is a schematic drawing of another embodiment of the capacitive touch panel module according to the present invention.

FIG. 16 is a top view of press button-type sensors, wherein a press button 60 is spaced from a surrounding ground layer 64 by a gap 62 such that a parasitic capacitance exists between the press button 60 and the ground layer 64. Referring to FIG. 17, a control circuit 55 charges and discharges a press button 60 through a conductive wire 552 and provides a signal in phase with the charging and discharging signal to a ground layer 64 through a conductive wire 554, thereby lowering a parasitic capacitance between the ground layer 64 and the press button 60 while providing a shielding effect.

The control circuit 55 has a structure illustrated in FIGS. 1 and 2. More particularly, a modulator produces a scanning signal and a shielding signal that are in phase with each other. The scanning signal and the shielding signal are coupled to a capacitive touch panel by a multiplexer and supplied to the sensor layer and the ground layer, respectively, so as to produce in-phase signals on the sensor layer and the ground layer.

Figure 18:
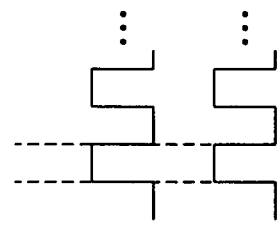
FIG. 18 illustrates possible waveforms provided by a control circuit according to the present invention.
Figure 18:
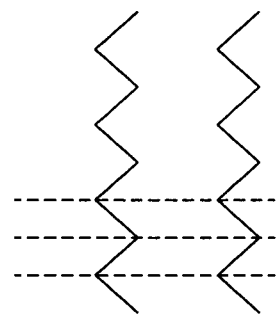
Figure 18:
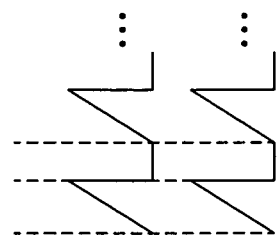

FIG. 18 demonstrates possible waveforms provided by the control circuit of the present invention. These waveforms include a square waveform, a triangular waveform, and a saw-tooth waveform.

In conclusion, the control circuit and control method for a capacitive touch panel according to the present invention provide in-phase signals to lower parasitic capacitances between adjacent conductors and reduce a base capacitance of the touch panel, thereby enhancing a sensing result. Therefore, a wider detection range and a greater thickness of capacitive medium are achieved to further improve performance of the capacitive touch panel.

The invention claimed is:

1. A control circuit for a capacitive touch panel, the capacitive touch panel comprising a first trace and a second trace, the control circuit comprising:
    a modulator for providing a first signal and a second signal in phase with the first signal;
    a multiplexer coupled with the capacitive touch panel and the modulator for simultaneously applying the first signal to the first trace and the second signal to the second trace for generating a third signal corresponding to the first trace; and
    a demodulator coupled with the multiplexer for demodulating the third signal on the first trace with a reference DC signal;
    wherein the first trace and the second trace are substantially parallel and directly adjacent to each other;
    wherein the demodulator comprises a first switch, a second switch, a third switch and a fourth switch, each having a first terminal and a second terminal,
    wherein the first terminals of the first switch and the second switch are directly coupled to a first output terminal of the demodulator,
    wherein the first terminals of the third switch and the fourth switch are directly coupled to a second output terminal of the demodulator,
    wherein the second terminals of the first switch and the third switch directly receive the third signal, and
    wherein the second terminals of the second switch and the fourth switch directly receive the reference DC signal.

2. The control circuit of claim 1, further comprising a voltage processing circuit for transforming a demodulation result of the demodulator into a change of capacitance.

3. A control circuit for a capacitive touch panel, the capacitive touch panel comprises a sensor layer and a ground layer, the control circuit comprising:
    a modulator for providing a first signal and a second signal in phase with the first signal;
    a multiplexer coupled with the capacitive touch panel and the modulator for simultaneously applying the first signal to the sensor layer and the second signal to the ground layer; and
    a demodulator for demodulating with a reference DC signal;
    wherein the demodulator comprises a first switch, a second switch, a third switch and a fourth switch, each having a first terminal and a second terminal,
    wherein the first terminals of the first switch and the second switch are directly coupled to a first output terminal of the demodulator,
    wherein the first terminals of the third switch and the fourth switch are directly coupled to a second output terminal of the demodulator,
    wherein the second terminals of the first switch and the third switch directly receive a signal from the sensor layer, and
    wherein the second terminals of the second switch and the fourth switch directly receive the reference DC signal.

4. A control method for a capacitive touch panel, the capacitive touch panel comprises a first trace and a second trace, the control method comprising the steps of:
    providing a first signal so as to charge and discharge the first trace;
    providing a second signal in phase with the first signal so as to charge and discharge the second trace;

simultaneously applying the first signal to the first trace and the second signal to the second trace; and demodulating a third signal on the first trace with a reference DC signal;

wherein the first trace and the second trace are substantially parallel and directly adjacent to each other, wherein demodulating the third signal is performed by a demodulator that comprises a first switch, a second switch, a third switch and a fourth switch, each having a first terminal and a second terminal, wherein the first terminals of the first switch and the second switch are directly coupled to a first output terminal of the demodulator, wherein the first terminals of the third switch and the fourth switch are directly coupled to a second output terminal of the demodulator, wherein the second terminals of the first switch and the third switch directly receive the third signal, and wherein the second terminals of the second switch and the fourth switch directly receive the reference DC signal.

5. The control method of claim 4, further comprising a step of transforming a result of demodulating the signal on the first trace with the reference signal into a change of capacitance.

6. A control method for a capacitive touch panel, the capacitive touch panel comprises a sensor layer and a ground layer, the control method comprising the steps of:

providing a first signal so as to charge and discharge the sensor layer;

providing a second signal in phase with the first signal to the ground layer; simultaneously applying the first signal to the sensor layer and the second signal to the ground layer; and demodulating a signal from the sensor layer with a reference DC signal;

wherein demodulating the signal from the sensor layer is performed by a demodulator that comprises a first switch, a second switch, a third switch and a fourth switch, each having a first terminal and a second terminal, wherein the first terminals of the first switch and the second switch are directly coupled to a first output terminal of the demodulator, wherein the first terminals of the third switch and the fourth switch are directly coupled to a second output terminal of the demodulator, wherein the second terminals of the first switch and the third switch directly receive the signal from the sensor layer, and wherein the second terminals of the second switch and the fourth switch directly receive the reference DC signal.

7. A capacitive touch panel module, comprising:

a capacitive touch panel having a first trace and a second trace;

a modulator for providing a first signal and a second signal in phase with the first signal;

a multiplexer coupled with the capacitive touch panel and the modulator for simultaneously applying the first signal to the first trace and the second signal to the second trace; and a demodulator for demodulating a third signal on the first trace with a reference DC signal;

wherein the first trace and the second trace are substantially parallel and directly adjacent to each other, wherein the demodulator comprises a first switch, a second switch, a third switch and a fourth switch, each having a first terminal and a second terminal, wherein the first terminals of the first switch and the second switch are directly coupled to a first output terminal of the demodulator, wherein the first terminals of the third switch and the fourth switch are directly coupled to a second output terminal of the demodulator, wherein the second terminals of the first switch and the third switch directly receive the third signal, and wherein the second terminals of the second switch and the fourth switch directly receive the reference DC signal.

8. The capacitive touch panel module of claim 7, wherein the first trace comprises a plurality of first sensors.

9. The capacitive touch panel module of claim 7, wherein the second trace comprises a plurality of second sensors.

10. The capacitive touch panel module of claim 7, wherein the second trace is adjacent to the first trace.

11. The capacitive touch panel module of claim 7, further comprising a voltage processing circuit for transforming a demodulation result of the demodulator into a change of capacitance.

12. A capacitive touch panel module, comprising:

a capacitive touch panel having a sensor layer and a ground layer;

a modulator for providing a first signal and a second signal in phase with the first signal;

a multiplexer coupled with the capacitive touch panel and the modulator for simultaneously applying the first signal to the sensor layer and the second signal to the ground layer; and a demodulator for demodulating with a reference DC signal;

wherein the demodulator comprises a first switch, a second switch, a third switch and a fourth switch, each having a first terminal and a second terminal, wherein the first terminals of the first switch and the second switch are directly coupled to a first output terminal of the demodulator, wherein the first terminals of the third switch and the fourth switch are directly coupled to a second output terminal of the demodulator, wherein the second terminals of the first switch and the third switch directly receive a signal from the sensor layer, and wherein the second terminals of the second switch and the fourth switch directly receive the reference DC signal.

13. The capacitive touch panel module of claim 12, wherein the sensor layer comprises a plurality of sensors.

* * * * *